Figure 1:
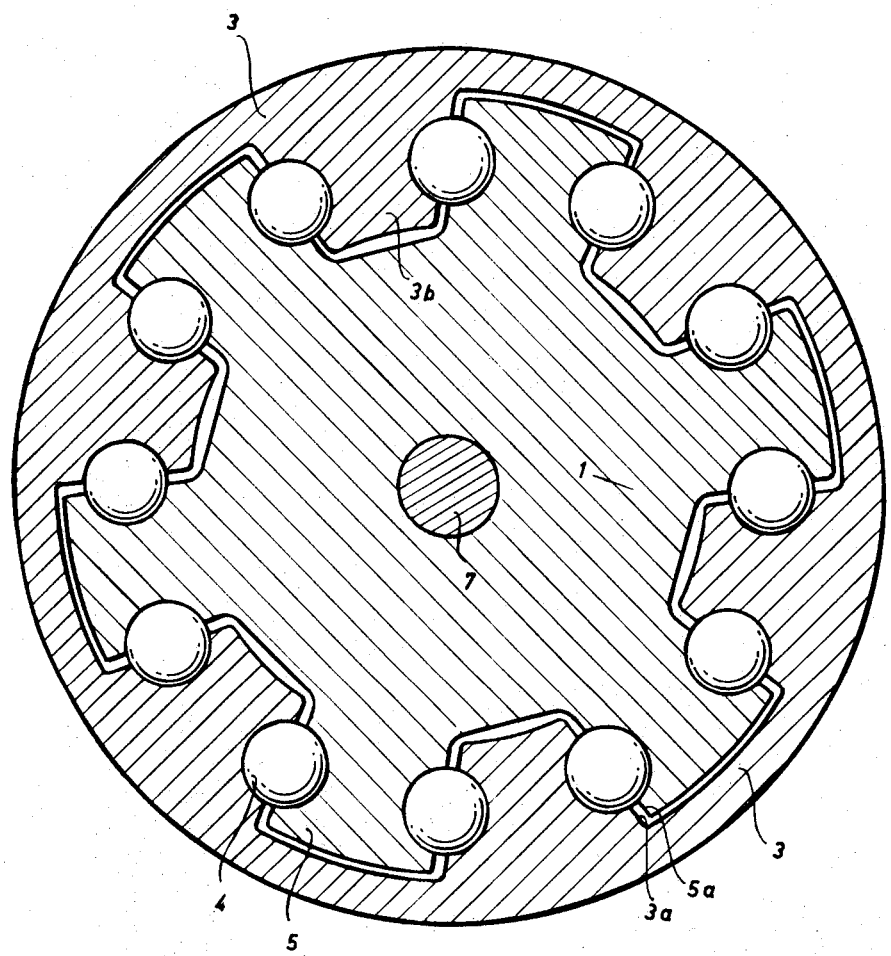

Jan. 9, 1968   E. BRETSCHNEIDER ET AL   3,362,190

FLEXIBLE COUPLING

Filed Dec. 22, 1964   7 Sheets-Sheet 1

INVENTORS
ERICH BRETSCHNEIDER &
HERMANN LEITNER
BY
Henry C. Westin
THEIR ATTORNEY Jan. 9, 1968   E. BRETSCHNEIDER ET AL   3,362,190
FLEXIBLE COUPLING Filed Dec. 22, 1964   7 Sheets-Sheet 4

INVENTORS
ERICH BRETSCHNEIDER &
HERMANN LEITNER
BY

THEIR ATTORNEY

Jan. 9, 1968        E. BRETSCHNEIDER ET AL        3,362,190
                         FLEXIBLE COUPLING
Filed Dec. 22, 1964                           7 Sheets-Sheet 7

INVENTORS
ERICH BRETSCHNEIDER &
HERMANN LEITNER
BY
Henry C. Westin
THEIR ATTORNEY United States Patent Office 3,362,190
Patented Jan. 9, 1968

3,362,190
FLEXIBLE COUPLING
Erich Bretschneider, Pittsburgh, Pa., and Hermann Leitner, Langenfeld, Germany, assignors to Siegner Maschinenbau G.m.b.H., a corporation of Germany
Filed Dec. 22, 1964, Ser. No. 420,389
Claims priority, application Germany, Dec. 27, 1963,
S 88,904 and S 88,905
1 Claim. (Cl. 64—9)

This invention relates to a flexible coupling of the type presently used for torsion-resistant connection of mill roll journals with their drive spindles, in which as power transmitting means, balls are being employed and wherein they enter half-way into semi-cylindrical bores of two concentrically arranged ring-like coupling parts.

Couplings having balls as power-transmitting means have been known for decades in various designs. One known design developed especially for large angles of inclination, which assures synchronization between the two parts joined by the coupling, is unfavorable from a manufacturing cost standpoint, because the shaping of the two coupling parts is very complicated.

In another known ball joint coupling, the shaping of the two coupling parts is more favorable, whereby the manufacture of the coupling is simpler and cheaper. This coupling, however, has the essential drawback in that of the twelve or eighteen built-in balls, even at the smallest angles of inclination, only two or four participate in the transmission of the torque. Thus the turning moments transferable with this coupling are rather slight. Furthermore, in this design of a coupling, even on experiencing a slight inclination, there is no synchronization between the connected shafts.

Already known are also ball joint couplings in which the balls engage half-way in semi-cylindrical bores of two concentrically arranged ringlike coupling parts. Such couplings are simpler and therefore cheaper to manufacture than the first-mentioned designs, because the two coupling parts have an uncomplicated shape. They assure, furthermore, a synchronized condition even with inclined shafts and they are suitable for transmitting high torques. The application of these couplings to transmit high torques, however, is possible only with angles of inclination to about 9°. In many rolling mills, however, the displacement of the adjustable rolls is such that for the drive spindles connected with the roll necks there may be an inclination up to 20° or more. This applies, particularly, to vertical stands for the rolling of wide slabs, with which it is desirable for various reasons to drive the rolls from above. The slight angles of inclination permissible for these high torques thus led forcibly to a great construction height of the roll housing or to the installation of gear systems movable with the rolls. For all these cases the known ball joint couplings are unsuitable, because the maximum permissible angle of inclination depends very heavily on the angle of repose between the balls and their course and on the marginal angle of the elastic ball bedding.

The coupling according to the invention also makes use of the idea known for many years, i.e., to have the balls thereof engage half-way into semi-cylindrical bores of two concentrically arranged rinklike coupling parts.

According to the present invention, in contrast to the hitherto known designs and to avoid the described drawbacks, it is suggested to arrange radially the partial attachments or joints of the two coupling parts between which the balls are embedded. In this condition, while maintaining the known advantages, precise kinematics is achieved, because the balls are always adjusted forcibly to half the angle of inclination during inclination of one of the two shafts connected through the coupling. Furthermore, the condition for synchronization of the shafts is met even with great angles of inclination. In a further advantageous embodiment of the invention it is suggested to embed the balls in several bores adjacent to one another, i.e. provide several ball races for the power transmission. In this case the essential advantage is obtained in that with equal diameter of the coupling the specific surface pressure of the balls and of the bores is considerably less. It is possible, therefore, with a coupling of approximately equal size to transmit considerably higher torques without reducing the service life.

Because in many rolling mills or other driving machines the main torque must only and always be transmitted in one rotary direction of the drive spindles, it is advisable to develop the coupling accordingly. The radial arrangement of the partial attachments or joints of the two ring-like coupling parts makes it possible to design the coupling with equal diameter for the transmission of essentially higher torques, if according to the present invention the radially proceeding attachments of the two ring parts are provided with semi-cylindrical bores to receive balls with variable diameters. In accordance with the ball diameter, the value of the transferable torques varies depending on the direction of rotation. With equal external dimensions and manufacturing costs, the coupling can thus be designed in a simple manner for the transmission of essentially higher torques.

Figure 2:
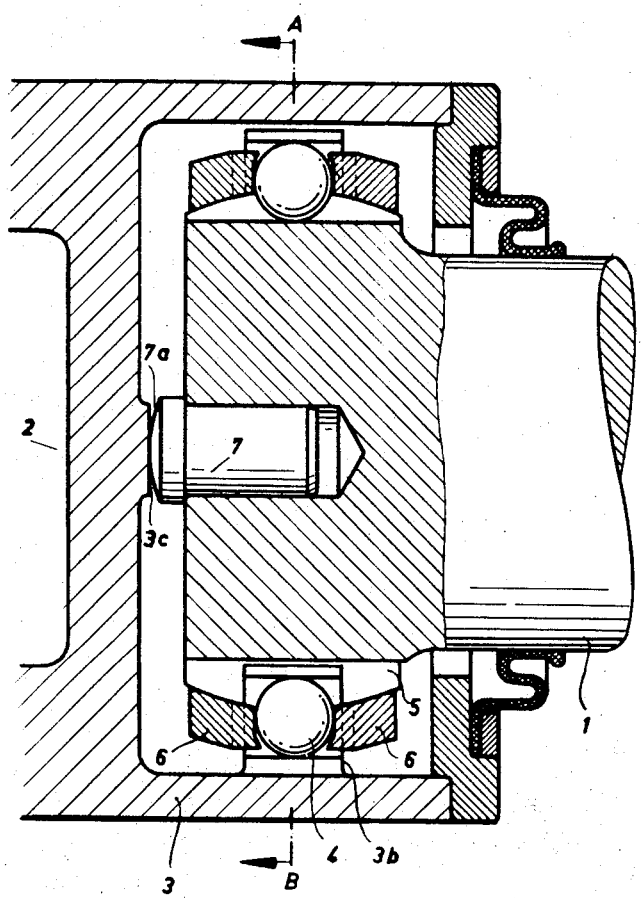
Figure 3:
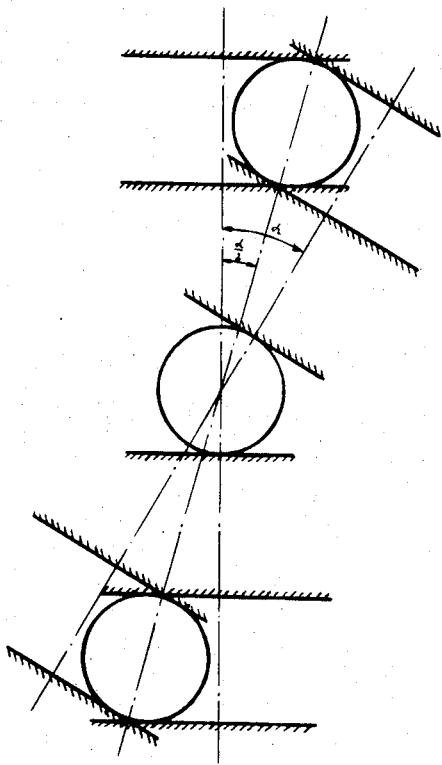
Figure 4:
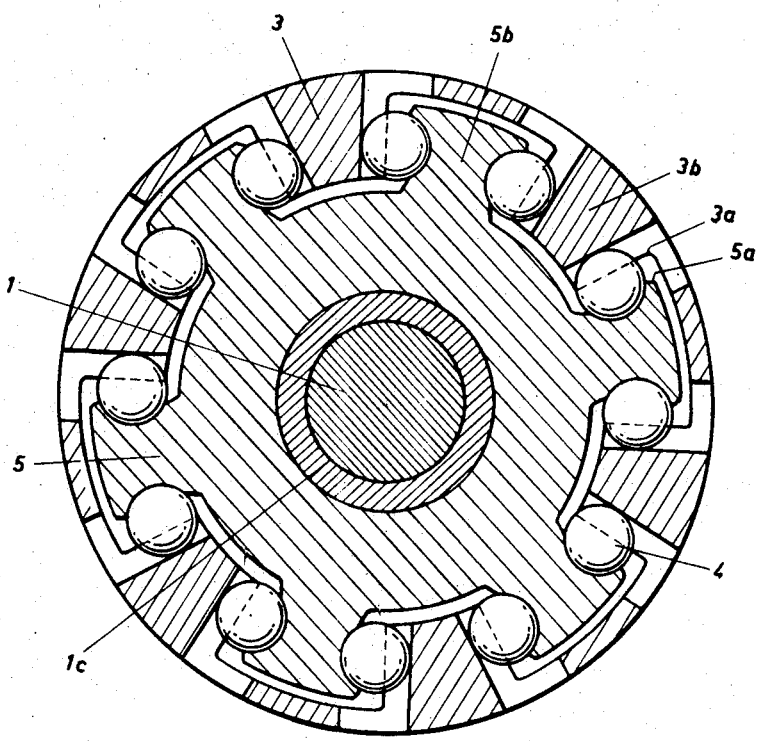
Figure 5:
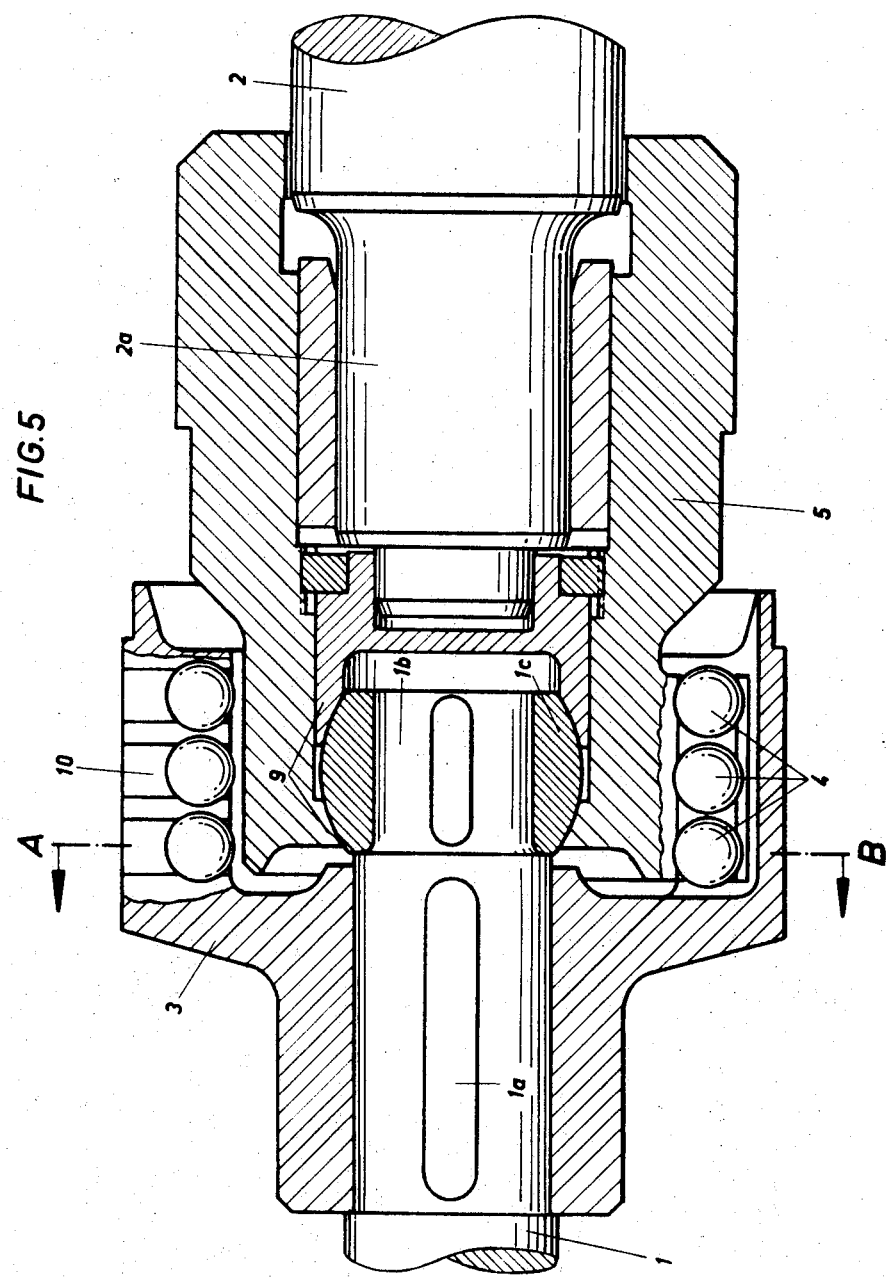
Figure 6:
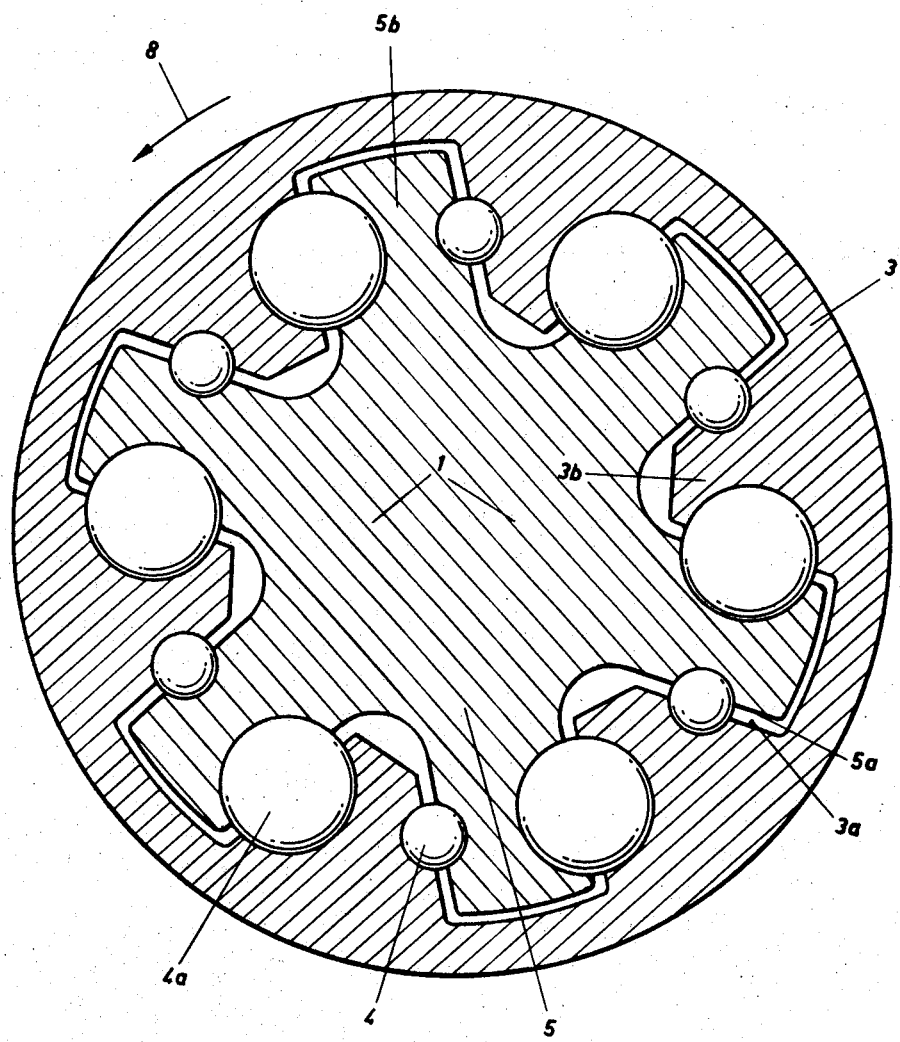
Figure 7:
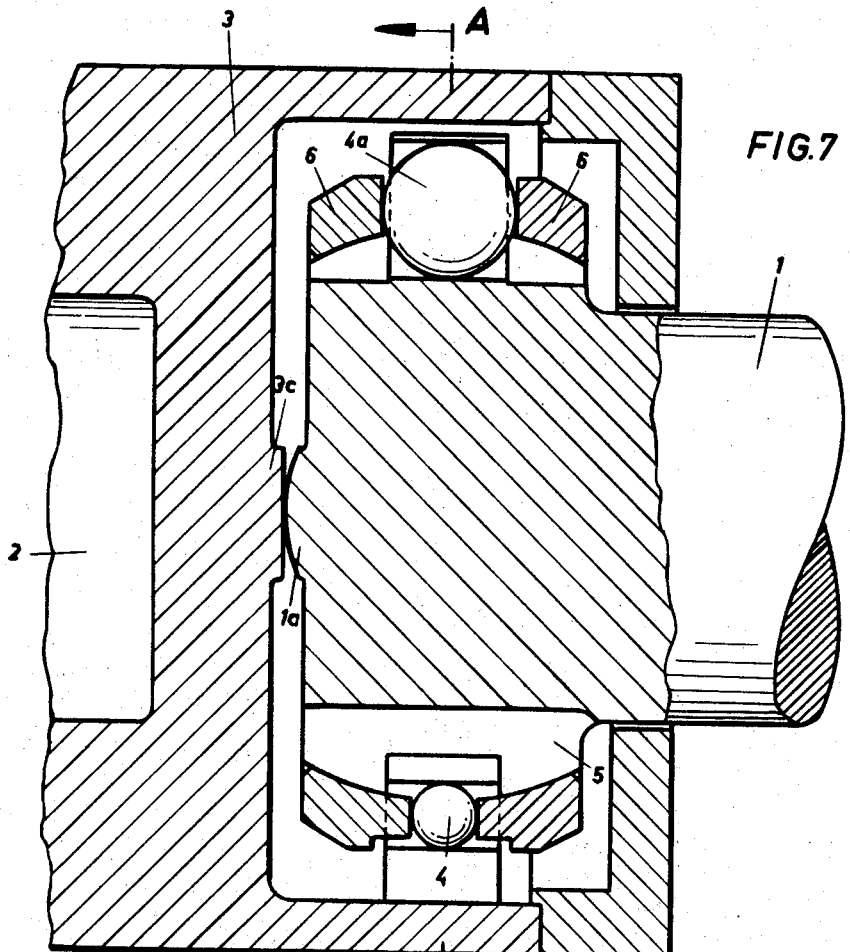
Figure 8:
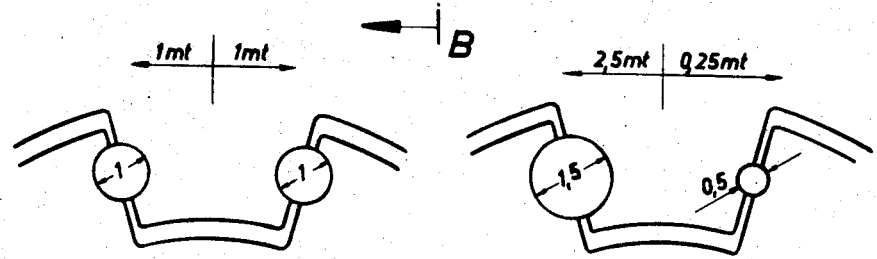

These objects, as well as others, will be better understood when the following specification is read along with the accompanying drawings of which:

FIGURE 1 is a sectional view taken on lines A–B of the coupling shown in FIGURE 2, FIGURE 2 is a longitudinal sectional view of the coupling shown in FIGURE 1, FIGURE 3 is a schematic illustration of the kinematics with the shafts inclined towards one another, FIGURE 4 is a cross-sectional view of a second embodiment of the present invention taken on lines A–B of FIGURE 5 which show the balls thereof embedded in several bores adjacent to one another of the coupling parts, FIGURE 5 is a longitudinal section through the coupling shown in FIGURE 4, FIGURE 6 is a cross-sectional view of another embodiment of the invention taken on lines A–B of FIGURE 7 showing balls of variable diameters to transmit the torque, FIGURE 7 is a longitudinal sectional view of the coupling as shown in FIGURE 6, and FIGURE 8 is a schematic representation of two couplings having the same diameters, but for the transmission of variably high torques.

With reference first to FIGURES 1 and 2 the drive shaft, which in the illustrated form consists of a driving spindle 1 of an adjustable roll 2 and whereas the spindle represents the inner coupling part, whereas on the journal of the roll 2 a coupling box 3 including a part 5 is fixedly mounted in a manner not shown, which forms the outer ring portion of the coupling. To transmit the torques, balls 4 are employed, which, in a known way, extend half-way into semi-cylindrical bores of the two ringlike, concentrically disposed coupling parts 3 and 5.

The illustrated arrangement is distinguished from known related couplings in the provision of the joints 3a and 5a of the two coupling parts 3 and 5 which are arranged radially of the axes of the coupling parts 3 and 5. In this connection, the outer ring portion 3 is provided with radial attachments 3b, the inner ring portion 5 with radial attachments 5b. The balls 4 on both sides, through fitting rings 6 partially encompassing them and disposed in the coupling part 5, are held in position in the coupling during assembling and disassembling of same and prevented from dropping out. The coupling part 3 has a central attachment 3c, which for the transmission of axial forces rests against the spherical surface of the head of a pin 7 inserted in the spindle 1. As is illustrated in FIGURE 3, with the inclination of one of the two parts joined by the coupling, the balls are adjusted forcibly to half the angle of inclination, which is the fundamental condition for the synchronism of the two parts joined by the coupling. It must be recognized, furthermore, that even with a great angle of inclination, all the balls participate in the transmission of the torque.

In another embodiment of the present invention according to FIGURES 4 and 5, a coupling box 3 is fixedly mounted with the aid of keys 1a on the drive spindle 1 of an adjustable roll 2, which forms the outer ring portion of the coupling. On the journals 2a of the roll 2, in a manner not shown, the coupling part 5 forming the inner ring portion of the coupling is fixedly mounted. To transmit the torques, the balls 4 are used, which in the familiar way extend half-way into each of the semi-cylindrical bores of the two ringlike, concentrically disposed coupling parts 3 and 5. The joints 3a and 5a of the two coupling parts 3 and 5 are arranged radially. The outer ring portion 3 is provided with radial attachments 3b, the inner ring portion 5 with radial attachments 5b. The stepped neck 1b of the drive spindle 1 is provided with a spherical surface 1c, which for the transmission of axial forces supports itself in a ball socket 9 of the ring portion 5. The two coupling parts 3 and 5 in the embodiment shown have three semi-cylindrical bores 10 arranged next to one another to receive the balls 4. In lieu of the three ball races one may, of course, provide only two or, in another case, more than three. In either case, with the coupling diameter being the same, the specific surface pressure of the balls and of their contact surfaces on the coupling parts is less than with the first-mentioned embodiment according to FIGURES 1, 2 and 3.

A still another embodiment of the present invention is shown in FIGURES 6 and 7 where there is fixedly mounted on the necks of an adjustable roll 2, in a manner not shown, a coupling box 3 forming the outer ring portion of the coupling, the inner ring portion 5 being a component of the drive spindle 1. The joints 3a and 5a of the two coupling parts 3 and 5 are disposed radially. The outer ring portion is provided with radial attachments 3b, the inner ring portion with radial attachments 5b. Each radial attachment has semi-cylindrical bores to receive balls 4 and 4a having variable diameters. In this embodiment when the coupling is rotating in the direction identified by the arrow 8 in FIGURE 6, a substantially higher torque can be transmitted than in the opposite direction of rotation, without the cross-section of the radial attachments 3a and 5a becoming smaller than if the bores and the balls for transmitting an equally high torque in both rotating directions are designed in accordance with the selected dimensions. For instance, if the coupling is so designed that in both rotary directions it transmits 1 mt., i.e. metric ton, and the ball diameter is then=1, the coupling, if the diameter of the balls of the one group=1.5 and the diameter of the balls of the other group=0.5, can transmit in the one rotary direction 2.25 mt. and in the other rotary direction 0.25 mt., as is illustrated in FIGURE 8. The balls 4 and 4a on both sides, through the fitting rings 6 are arranged in the coupling part 5 and held in position during the assembly and disassembly of the coupling and prevented from falling out. The coupling part 3 has a central attachment 3c, which for the transmission of axial forces rests against the spherical surface 1d of the drive spindle 1.

In all the embodiments of the present invention, steel balls have been contemplated normally. However, if a rotary-flexible connection of two shafts is necessary, the steel balls may be substituted by balls of elastic material, such as rubber, plastic or the like, or a combination of different materials.

In accordance with the provisions of the patent statutes, we have explained the principle and operation of our invention and have illustrated and described what we consider to represent the best embodiment thereof. However, we desire to have it understood that within the scope of the appended claim, the invention may be practiced otherwise than as specifically illustrated and described.

We claim:
1. In a flexible coupling of the type employed to transmit high torsional forces from one shaft to another comprising:
   a driving coupling member having a number of spherical groups of two or more grooves arranged perpendicularly to the axis of the coupling; said grooves arranged on straight radial lines with respect to the axis of the coupling and parallel to each other;
   a torsional force transmitting ball for each of said radial grooves;
   a driven coupling member having a number of sperical grooves, each for receiving the balls of one of said groups of said radial grooves of said driving member and arranged parallel to the axis of the coupling and perpendicular to said radial grooves, and
   certain of the complementary grooves being of different diameters than other complementary grooves for receiving torsional force transmitting balls of different diameters.

References Cited
UNITED STATES PATENTS

| 1,763,332 | 6/1930 | Sykes | 64—9 |
| 2,473,036 | 6/1949 | Miller | 64—21 |
| 2,578,763 | 12/1951 | Trbojevich | 64—9 |
| 2,906,106 | 9/1959 | Haas | 64—9 |

OTHER REFERENCES

German printed application No. 1,085,727 published July 21, 1960.

MILTON KAUFMAN, *Primary Examiner.*

HALL C. COE, FRED C. MATTERN, *Examiners.*